United States Patent
Franklin et al.

(10) Patent No.: US 7,213,166 B2
(45) Date of Patent: *May 1, 2007

(54) IN-PLACE DATA TRANSFORMATION FOR FAULT-TOLERANT DISK STORAGE SYSTEMS

(75) Inventors: Chris R. Franklin, Merrimack, NH (US); Jeffrey T. Wong, Newton, MA (US)

(73) Assignee: Broadcom Corporation, Irvine, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 10/924,264

(22) Filed: Aug. 24, 2004

(65) Prior Publication Data

US 2005/0138286 A1 Jun. 23, 2005

Related U.S. Application Data

(63) Continuation of application No. 09/832,661, filed on Apr. 11, 2001, now Pat. No. 6,785,836.

(51) Int. Cl.
*G06F 11/00* (2006.01)

(52) U.S. Cl. .............................. 714/7; 714/6; 711/114; 711/165

(58) Field of Classification Search ................ 711/114, 711/165; 714/6, 7
See application file for complete search history.

(56) References Cited

U.S. PATENT DOCUMENTS

| | | | |
|---|---|---|---|
| 5,524,204 A | 6/1996 | Verdoon, Jr. .................... 714/6 |
| 5,542,065 A * | 7/1996 | Burkes et al. ............... 711/114 |
| 5,574,851 A | 11/1996 | Rathunde ......................... 714/7 |
| 5,615,352 A | 3/1997 | Jacobson et al. ............ 711/114 |
| 5,758,118 A | 5/1998 | Choy et al. .................. 711/114 |
| 5,875,457 A | 2/1999 | Shalit .......................... 711/114 |
| 6,240,486 B1 | 5/2001 | Ofek et al. .................. 711/112 |
| 6,275,892 B1 | 8/2001 | Arnott ......................... 710/200 |
| 6,304,942 B1 | 10/2001 | DeKoning ................... 711/114 |
| 6,530,004 B1 | 3/2003 | King et al. .................. 711/165 |
| 6,611,827 B1 * | 8/2003 | Riedle ............................ 707/1 |
| 6,718,435 B2 | 4/2004 | Riedle ......................... 711/114 |
| 6,785,836 B2 * | 8/2004 | Franklin et al. ................ 714/6 |
| 6,996,689 B2 * | 2/2006 | Chatterjee et al. .......... 711/162 |
| 2004/0044837 A1 | 3/2004 | Hasbun et al. .............. 711/103 |
| 2005/0198450 A1 * | 9/2005 | Corrado et al. ............. 711/162 |
| 2005/0210322 A1 * | 9/2005 | Corrado ....................... 714/13 |

* cited by examiner

*Primary Examiner*—Robert W. Beausoliel
*Assistant Examiner*—Christopher McCarthy
(74) *Attorney, Agent, or Firm*—Sterne, Kessler, Goldstein & Fox PLLC

(57) ABSTRACT

A fault tolerant method transforms physically contiguous data in-place on a disk by partitioning the physically contiguous data into an empty region physically adjacent to data regions including a first data region and a last data region, the first and last data regions at opposing ends of the physically contiguous data regions. The physically contiguous data are transformed in an order beginning with the first data region and ending with the last data region. The transforming step perform first locking and reading the first data region, second, transforming the first data region, third, writing and unlocking the transformed first data region to the empty region, and fourth, declaring the first data region as the empty region while declaring the empty region as the first region. The first through fourth steps are repeated for each data region, until completion, to transform the physically contiguous data in-place on the disk.

16 Claims, 6 Drawing Sheets

IN-PLACE DATA TRANSFORMATION FOR FAULT-TOLERANT DISK STORAGE SYSTEMS

CROSS-REFERENCE TO RELATED APPLICATIONS

This is a continuation of U.S. application Ser. No. 09/832,661, filed Apr. 11, 2001, now U.S. Pat. No. 6,785,836, incorporated herein by reference in its entirety.

FIELD OF THE INVENTION

This invention relates generally to the field of disk storage systems, and more particularly to transforming data between various disk storage data formats.

BACKGROUND OF THE INVENTION

Modern computer systems can persistently store huge amounts of data on physical disks. It is not unusual for a single disk to store gigabytes of data, and large systems can have hundreds, if not thousands of disks. Users of these systems demand continuous, fault-tolerant access to the data. However, from time to time as systems expand and modernize, it is necessary to transform the data to a different format. This is inevitable, and a problem because most prior art systems require extra disks to store copies of the data during the transformation so that should a fault occur, the data can be recovered. This increases the cost of the system.

There are other problems with large databases. The performance of disk devices is limited by physical constraints, such as the speed at which disks can rotate, and heads can move. Clearly, transforming large amounts of data stored on many disks is a costly and time-consuming process. It is a purpose of the present invention to decrease cost, and improve performance for large-scale data transformations.

Most modern, mid-range to high-end disk storage systems are arranged as redundant arrays of independent disks (RAID). A number of RAID levels are known. RAID-0 "stripes" data across the disks. RAID-1 includes sets of N data disks and N mirror disks for storing copies of the data disks. RAID-3 includes sets of N data disks and one parity disk. RAID-4 also includes sets of N+1 disks, however, data transfers are performed in multi-block operations. RAID-5 distributes parity data across all disks in each set of N+1 disks. RAID levels 10, 30, and 50 are hybrid levels that combine features of level 0, with features of levels 1, 3, and 5.

A key feature in all modern RAID controllers is the ability to transform data from one RAID level, e.g., RAID-3, to another RAID level, e.g., RAID-5 or RAID-10, and certainly to RAID levels yet to be defined in the future. This is called RAID level migration. In the past, RAID level transformation was done off-line. This meant that no user data transfers were permitted during the transformation. In other words, users of the system were denied access to stored data, perhaps for hours, while the data was transformed from a starting level to a final level.

Today, RAID systems are the core of most large-scale databases and file systems used worldwide. Users of such systems, local and remote, demand continuous access to the stored data. In a global data processing environment, where access is frequently by the Internet, and can happen at any time, scheduled "down-time" is intolerable.

Therefore, modern RAID controllers allow RAID level migration while users continue to access data. This is know as on-line RAID level migration (ORLM). Various method of accomplishing this task are known. The key attributes of a good ORLM strategy are: the transformation should be totally transparent to the users, i.e., the RAID system is never taken off-line, and the system's performance does not degrade; and levels of fault-tolerance are maintained during the transformation, in both the starting and final RAID level.

In the prior art, RAID level migration typically requires separate disk space for a temporary storage or "backing" area, usually in the format of the starting RAID level. This area has the same fault tolerance as the minimum fault-tolerance of the starting RAID level. Using the temporary storage area for ORLM has at least two extremely large performance problems.

The first is due to the physical nature of how disk drives are constructed and operate. Disk read/write heads are mounted on arms driven linearly or radially by electrical pulses to stepper motors or voice coils to move to across various tracks. The improvement in "seek" time seems to have leveled, and even the fastest disks require about 1 millisecond to move track-to-track, and the average seek time latency is an order of magnitude greater. The constant movement of the heads between the tracks used for the temporary storage area and the tracks used for the user data causes a noticeable degradation in performance.

Second, the data need to be copied twice, first from the starting RAID set to the temporary storage area, and then again from the temporary storage area to the final RAID set. Consequently, such an OLRM strategy is bad, not only is the user subjected to degraded performance, but also the degraded performance can last for hours, if not days.

Therefore, there is a need for an improved on-line RAID level transformation strategy that does not require a temporary storage area so that the performance of the system during the transformation does not degrade, and the amount of time that is required for the transformation is reduced.

SUMMARY OF THE INVENTION

A primary objective of the present invention is to provide a method and system for changing the RAID level while allowing user data access, without copying any data to a temporary storage area.

Another objective of the present invention is to perform RAID level migration without causing any reduction in fault tolerance.

Another objective of the present invention is perform RAID level migration while minimizing the performance impact on users who are accessing the array while the RAID level migration takes place.

Another objective of the present invention is to perform RAID level migration in a shorter amount of time than RAID level migration schemes that require copying of data to a temporary storage area.

In accordance with the invention, the data are transformed in a most optimal manner with a single copy operation while user concurrently access the data, without a reduction in fault-tolerance and with less of a performance impact.

More particularly, a fault tolerant method transforms physically contiguous data in-place on a disk by partitioning the physically contiguous data into an empty region physically adjacent to data regions including a first data region and a last data region, the first and last data regions at opposing ends of the physically contiguous data regions.

The physically contiguous data are transformed in an order beginning with the first data region and ending with the last data region. The transforming performs the steps of first locking and reading the first data region, second, transforming the first data region, third, writing and unlocking the transformed first data region to the empty region, and fourth, declaring the first data region as the empty region while declaring the empty region as the first region. The first through fourth steps are repeated for each data region, until completion, to transform the physically contiguous data in-place on the disk.

DETAILED DESCRIPTION OF THE PREFERRED EMBODIMENT

Basic Goals of In-Place Fault Tolerant Data Transformation

On-line RAID level migration transforms data from any starting RAID level (0, 1, 2, 3, 4, 5, 10, or 50) to any other RAID level (0, 1, 2, 3, 4, 5, 10, or 50) without taking the RAID system off-line. Although the present invention is described in terms of OLRM from RAID-5 set to RAID-10, it should be understood that the system and method described herein can be used to transform any type of data stored on disks.

ORLM Mapping for Multiple Disks

Figure 1:
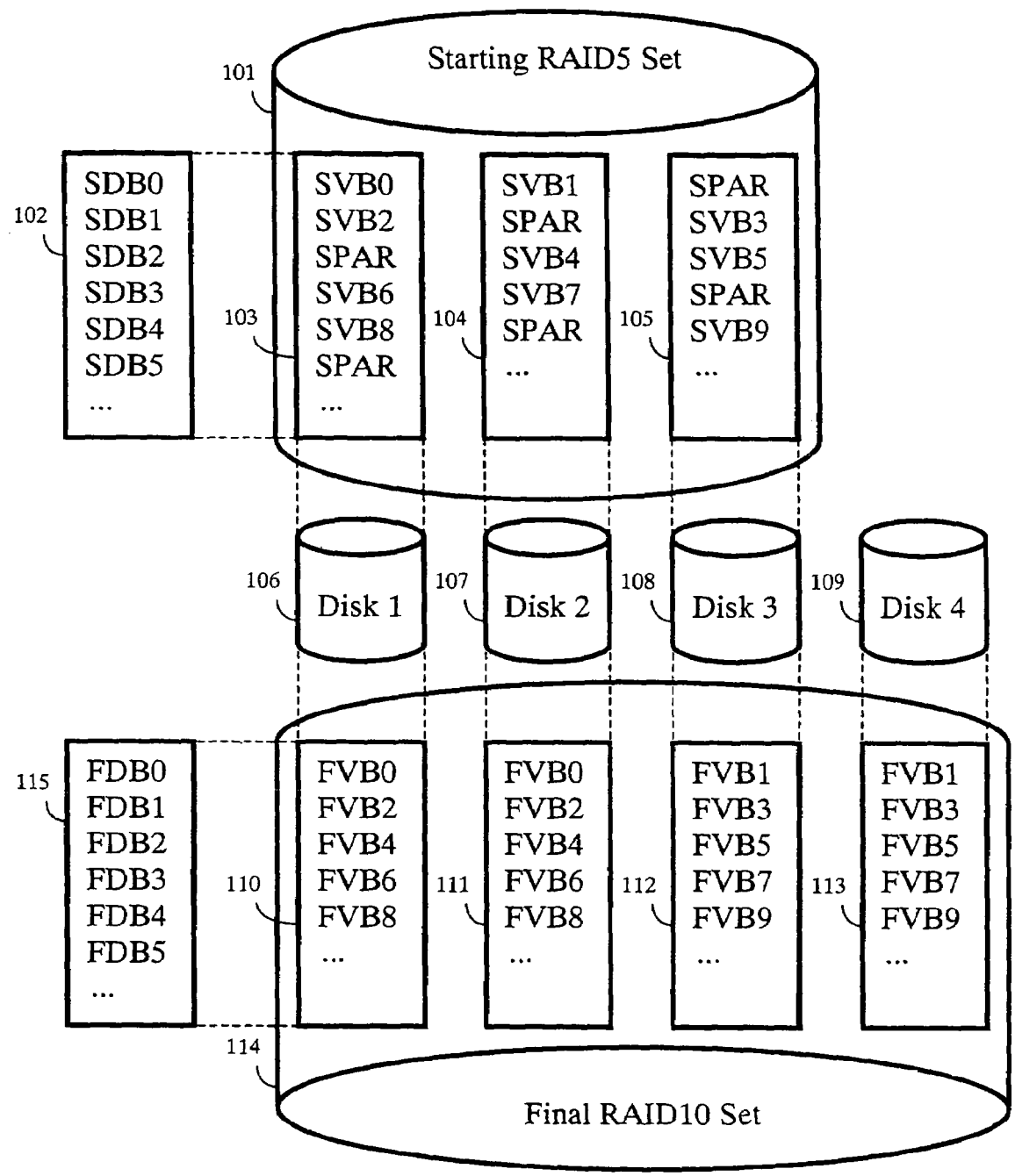
FIG. 1 is a block diagram of disks mapped to starting and final RAID level according to the invention.

FIG. 1 shows the structure a set of disks 106–109 used to transform the starting RAID-5 set 101 to the final RAID-10 set 114 according to our invention. For the starting RAID set 101, the transformation uses the same starting data blocks (SDB) 102 on each of the disks 106–108.

The FIG. 1 also shows a start virtual block (SVB) and parity (SPAR) mapping 103–105. SVB0 is mapped to Disk1 106, SDB0; SVB1 is mapped to Disk2 107, SDB0; a parity block (SPAR), for a first stripe, is mapped to Disk3 108, SDB0; DVB2 is mapped to Disk1 106, SDB1; and so forth.

Final data blocks (FDB) 115 are mapped using final virtual blocks (FVB) 110–113. The Figure shows the mapping of virtual blocks (FVB0) to Disk1 106 and Disk2 107, FDB0, FVB1 is mapped to Disk3 108 and Disk4 109, FDB0; FVB2 is mapped to Disk1 106 and Disk2 107, FDB1; etc.

Our goal is to provide on-line, in-place transformation of the data from all of the blocks 102 in the starting RAID set 101 to all of the blocks 115 in the final RAID set 114, while preserving the data integrity characteristics of the starting RAID set 101. The transformation changes the mapping from the starting RAID set 103–105 to the mapping of the final RAID set 110–113.

FIG. 1 shows that all of the virtually mapped blocks 103–105 and 110–113 for the starting RAID set have corresponding physical data block 102–115 on each of the disk drive 106–108. For any number of disk drives in any RAID level this is true. FIG. 1 also shows that Disk1 106, Disk2 107 and Disk3 108 transform data from the respective data sets 103, 104, and 105 to the respective data sets 110, 111, and 112. It is important that those blocks are changed substantially "in place," meaning that there is not a temporary storage area on some remote physical area of the disk. Disk2 106 and Disk3 107 use the exact same algorithm in parallel with Disk1.

Transforming Data on a Single Disk for OLRM

Figure 2:
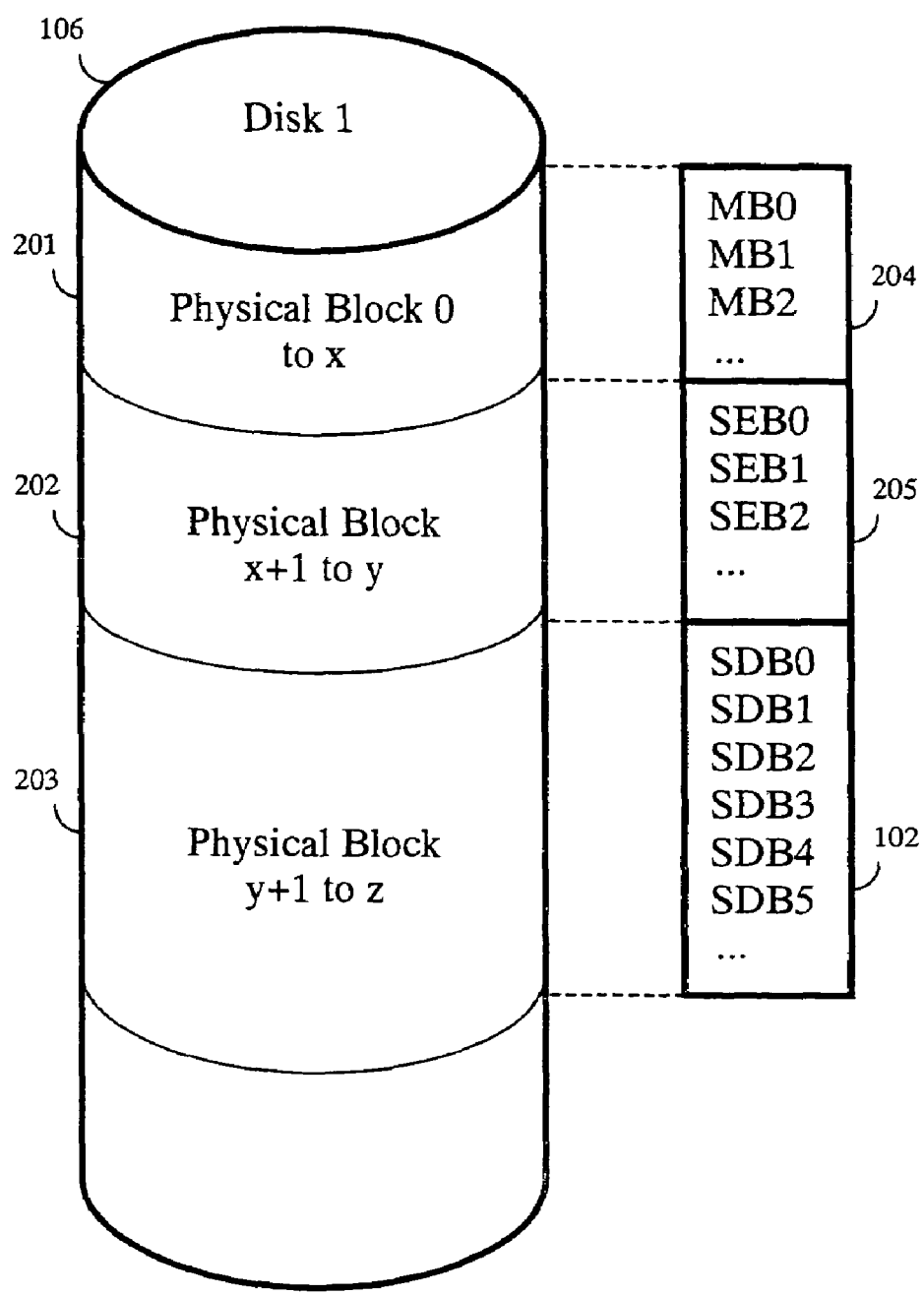
FIG. 2 is a block diagram of mapping in a first disk of the starting RAID level.

FIG. 2 shows the details of the transforming according to the invention for the single disk (Disk1) 106. The identical transformation is performed, in parallel, on all of the other disk drives because all starting data blocks 102 on the Disk1 106 have a corresponding starting data blocks on all of the other drives 107–108.

Similarly, all final data blocks 115 on Disk1 106 have corresponding final data blocks on the other drives 107–108–109.

FIG. 2 shows the details of the mapping of physically contiguous block on a first disk of the starting RAID level at the start of the ORLM migration according to our invention. Metadata blocks (MB) 204 are mapped to physical blocks 0 through x 201. Metablocks typically store higher system information about the data being migrated, and not the actual user data itself. Because metadata is relatively static, and infrequently accessed, it is of less concern.

Empty Blocks

Starting Empty Blocks (SEB) 205 are mapping to pre-allocated "empty" blocks x+1 through y. The size of the empty region should be large enough so that data transfers are performed efficiently, yet not so large that head movement between the adjacent data blocks that are being transformed and the empty blocks causes a degradation in performance, for example, at least one track. For large disks, the empty region can $10^{-5}$ (one ten-thousandth), or a very small fraction of the data being transformed. The data stored in the empty blocks is irrelevant because, as described below, that data are overwritten during the transformation.

The starting data blocks 102 are mapped to physical blocks y+1 to z. Note that throughout the description of our ORLM method, the SDB's 102 always represent the physical data blocks which are virtually mapped to the starting RAID set 101 on Disk1 106. The FDBs 115 always represent the final physical data blocks which are virtually mapped to the final RAID set 114 on Disk1 106.

Operation of the Transformation Method

Figure 3:
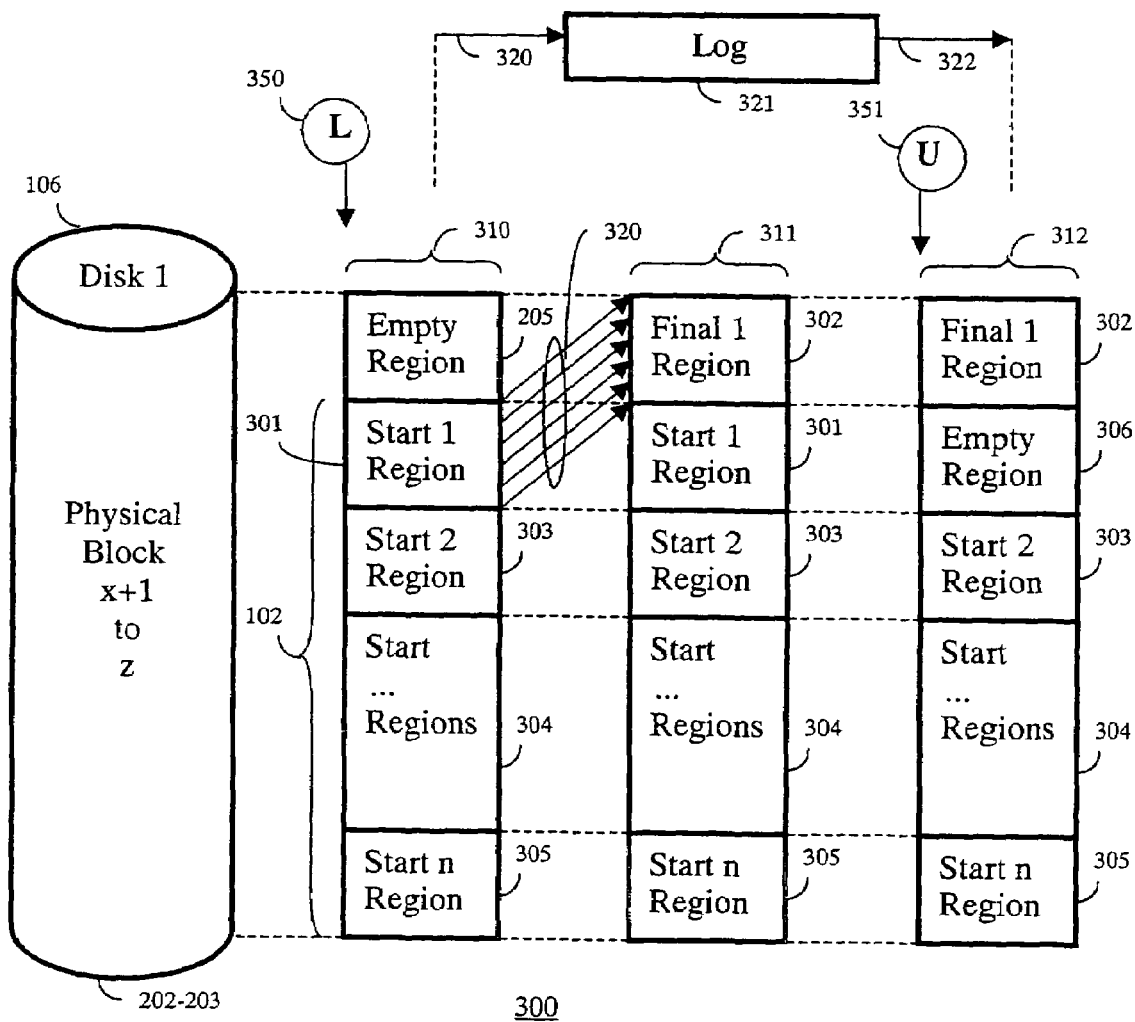
FIG. 3 is a block diagram of a first step in an on-line data transformation method according to the invention.

FIG. 3 shows a process 300 by which regions of blocks are transformed, in-place, to construct the final RAID set. We will focus on physical blocks x+1 through z 202–203 of disk 106 that store frequently accessed, actual user data, and not on the blocks 201 that store the metadata.

Columns 310, 311, and 312 respectively show the states of the regions before, during and after the transforming. Before transforming, the top region is an empty region 205, and the regions below are starting regions 301–303–304–305 mapped to the starting blocks. Each region includes multiple blocks according to the arrangement of the data in the RAID system at the time the transformation is started. The regions are small enough so that any block operations on the region do not affect the overall performance of the system, yet large enough to allow efficient multi-block RAID operations.

Locking and Logging

At the beginning of state 310, the start 1 region 301 can be "locked" (L) 350 to block user access to the region. A log 321 can be written to record which region is being copied while the region remains locked. The log 321 includes sufficient information to allow recovery in case of a failure. These two operations serve two purposes. The lock prevents the user from writing data to a region which is being transformed, and is, therefore, ambiguous in its destination. The log also enables error recovery. The region remains locked until region 301 is completely copied 320 to a final region 302. If a failure occurs before the start region 301 is copied, a restart can occur because none of the data in start 1 region 301 has been destroyed, and the log 321 can be used to recover the data.

Data Transformation

The actual data transformation, for each region, implies a read of the data in the region, a transformation on the data, and a write of the transformed data into a physically adjacent empty region. For RAID systems the transformation converts the data from one level to another. This can include generating parity blocks, deleting parity blocks, generating mirror copies, or deleting mirror copies depending on the specification of the starting and final level. Other possible data transformations can include compression of data, encryption or decryption of data, or transformation to some other file format. Numerous data transformation processes are known in the art, and any of these can be used during the in-place transformation according to the invention.

During the transformation, the start 1 region 301, as well as the other start regions 303–304–305 are unaffected.

When the region has been transformed, the lock is removed (U) 351, and the log 321 is updated 322. In state 312, the user accesses are now directed at the final region 302.

Figure 4:
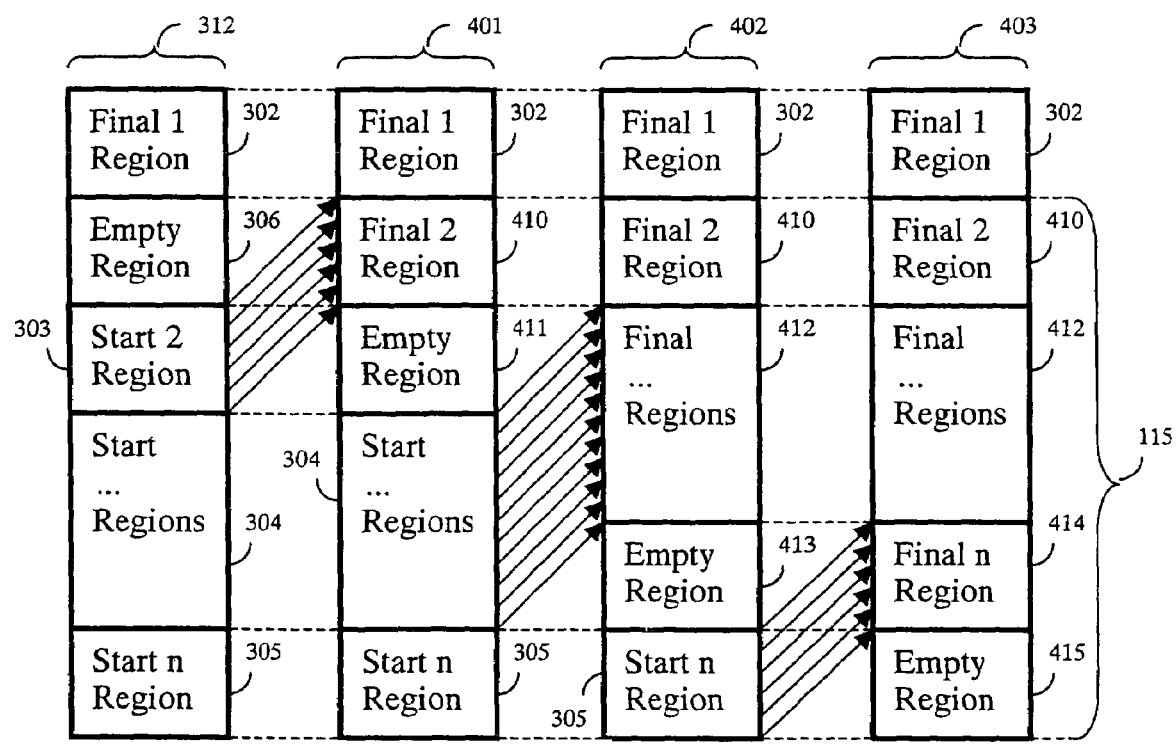
FIG. 4 is a block diagram of remaining steps of the on-line data transformation according to the invention.

At this point, what was start 1 region 302 is now an empty region 306. That is, the empty region has moved physically down one step in the column, and this empty region can now be used to receive the transformed data of start 2 region 304, as shown in FIG. 4.

From the state 312, start 2 region 303 is transformed to final 2 region 410, leaving the new empty region 411 where start 2 region 303 used to be. The state 401 shows the new region arrangement 302–410–411–304–305. From the state step 401, all of the other start regions 304 are transformed to all of the other final regions 412 one region at a time. The third arrangement 402 of regions shows the results of all of these transformations 302–410–412–413–305. Finally, the last region, start n region 305 is transformed to final n region 414, leaving new empty region 415 as shown in the last the final state 403 for the entire final RAID set 114.

ORLM Mapping for a Single Disk at Finish of ORLM

Figure 5:
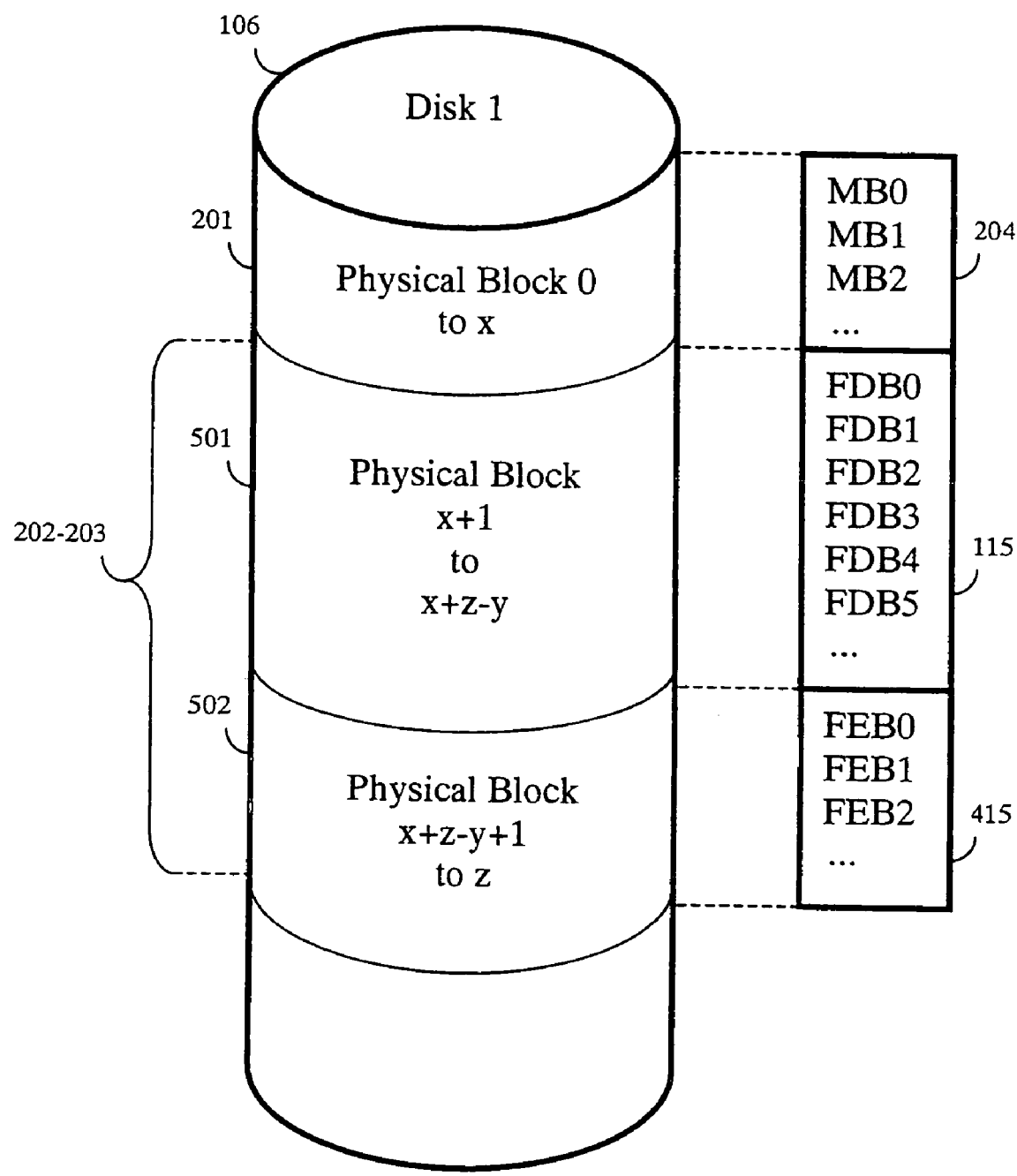
FIG. 5 is a block diagram of mapping of a first disk in the final RAID level.

FIG. 5 shows the details of the mapping in the first disk of the final RAID level at the finish of the ORLM according to our invention. Specifically, FIG. 5 shows the mapping of the arrangement final RAID-10 set on Disk1 106. The first section of the disk 201 is still the metadata blocks 204. The second two sections of the disk 501–502 occupy the same blocks x+1 through z that were occupied by the starting data blocks 203 and starting empty blocks 202.

Now, the final data blocks 115 correspond to the first set of physical blocks x+1 through x+z−y 501. The final empty blocks 415, now occupy the last piece of space on the disk data area, physical blocks x+z−y+1 to z 502.

Figure 6:
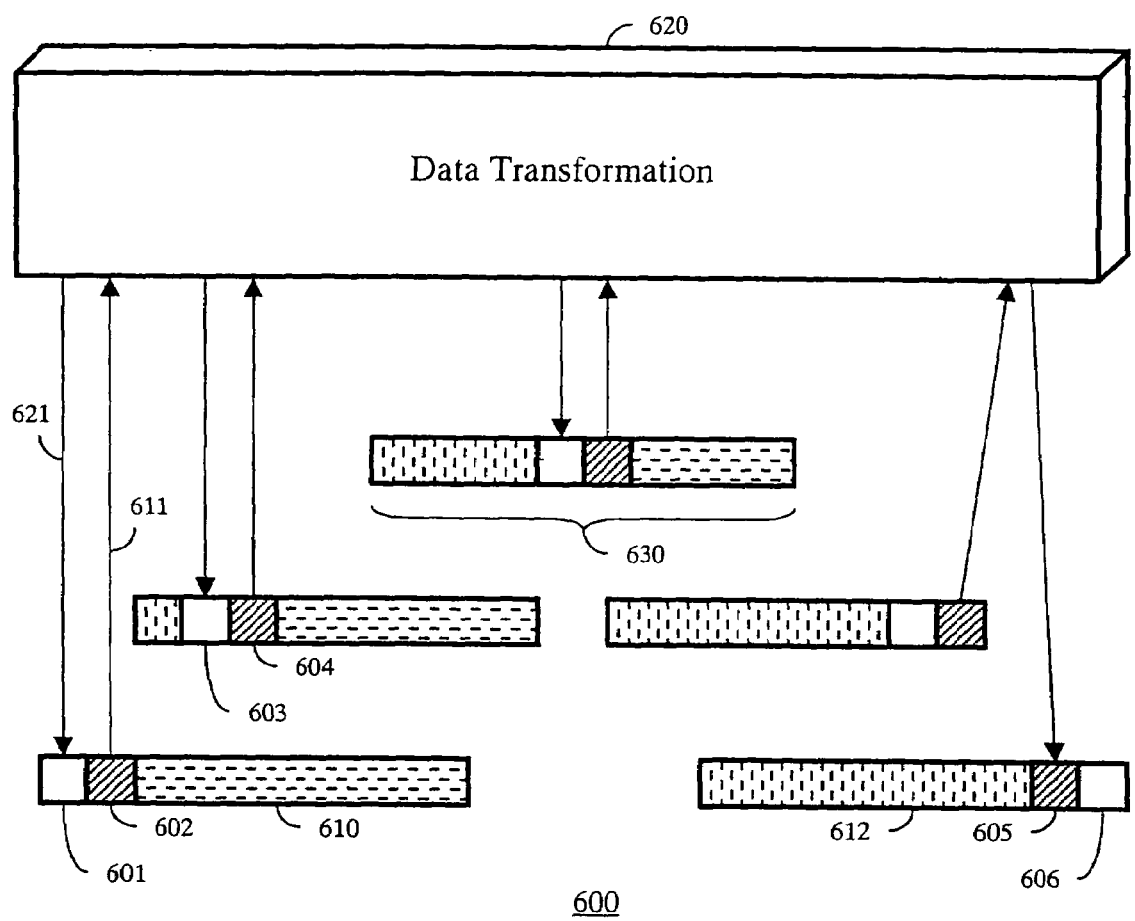
FIG. 6 is a block diagram of the overall in-place transformation method according to the invention.

FIG. 6 is an overall view of the in-place transformation method 600 according to the invention, at the start, during, and finish of the method. An empty region 601 is allocated physically adjacent to a first data region 602 of the physically adjacent disk data 610 to be transformed. The first data block 602 is read 611, transformed 620, and then, written 621 to the empty region 601. At this point, the first block can now be declared as the empty block 603, to receive the second data block 604. These steps are repeated 630 for all remaining blocks, while the empty region "moves" left through the data, until the last block 605 has been transformed, and the empty block 606, effectively, is at the physically opposing end of the newly transformed data 612 (which was derived from the original data 610). Thus, our method physically moves the empty region, from left-to-right, right-to-left, or top-to-bottom, etc., through the data regions while transforming the data in-place.

Subsequent ORLM Transforming on Same Data

The descriptions above describe how transformation takes place on the first transformation. For the second transformations, the empty space is on the other end of the useful data. Therefore, during a next transformation, the empty region moves through the data in a reverse direction, and so forth, reversing direction for each subsequent transformation.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We claim:

1. A system for transforming physically contiguous data, comprising:
   a disk storing the physically contiguous data partitioned into an empty region and a plurality of physically contiguous data regions between a first data region and a last data region; and
   a processor connected to the disk, said processor having an associated operating program defining a sequence of instructions that transform the physically contiguous data by performing the following steps:
   reading said first data region;
   transforming said first data region;
   writing said transformed first data region to said empty region;
   redefining said first data region as said empty region and said empty region as said first region; and
   repeating said reading, transforming, writing, and redefining steps for each data region to transform the physically contiguous data in-place on the disk.

2. The system of claim 1, wherein said step of reading the first data region includes locking said first data region.

3. The system of claim 1, wherein said step of writing said transformed first data region includes unlocking said first data region.

4. The system of claim 2, further comprising means for logging a user attempt to access a data region that is locked during transformation thereof.

5. The system of claim 4, further comprising means for recovering said user attempt from the log after a failure of said user attempt.

6. The system of claim 1, wherein said step of transforming said first data region for transforms said first data region from a first RAID level to a second RAID level different from said first RAID level.

7. The system of claim 1, wherein said operating program comprises instructions for reversing the order of processing of said plurality of data regions in a subsequent transformation.

8. The system of claim 1, wherein said processor is connected to a plurality of disks and transforms a plurality of physically contiguous data stored on a plurality of disks in parallel.

9. A method for transforming data stored on a disk in a plurality of substantially contiguous data regions between a first data region and a last data region, comprising:
    identifying an empty data region;
    beginning with said first data region and ending with said last data region, designating each of said data regions as a currently processed region and transforming said currently processed region by:
    a) reading said currently processed region,
    b) transforming said currently processed region,
    c) writing the transformed currently processed region to said empty region,
    d) redesignating said empty region as said currently processed region, and
    e) if there are more data regions to be transformed, redesignating said currently processed region as said empty region for the transformation of the next currently processed region.

10. The method of claim 9, comprising the further step of locking said currently processed region during transformation.

11. The method of claim 10, comprising the further step of logging user attempts to access a data region that is locked during transformation.

12. The method of claim 11, comprising the further step of recovering said user access attempt after a failure of said attempt.

13. The method of claim 9 wherein said step of transforming said currently processed region transforms said region from a first RAID level to a second RAID level different from said first RAID level.

14. The method of claim 9, comprising the further step of reversing an order of processing of said data regions for a subsequent transformation of the same regions.

15. The method of claim 9, wherein said plurality of data regions constitute physically contiguous data.

16. The method of claim 9, comprising the further step of transforming in parallel a plurality of said physically contiguous data regions stored on a plurality of disks.

* * * * *